US 6,618,520 B2

(12) United States Patent
Tew (10) Patent No.: US 6,618,520 B2
(45) Date of Patent: Sep. 9, 2003

(54) MICROMIRROR OPTICAL SWITCH

(75) Inventor: Claude E. Tew, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/966,183

(22) Filed: Sep. 28, 2001

(65) Prior Publication Data

US 2002/0034356 A1 Mar. 21, 2002

Related U.S. Application Data (60) Provisional application No. 60/164,223, filed on Nov. 9, 1999, and provisional application No. 60/236,533, filed on Sep. 29, 2000.

(51) Int. Cl.[7] ............... G02B 6/26; G02B 6/42
(52) U.S. Cl. .......................... 385/18; 385/16
(58) Field of Search ............... 385/16, 17, 18

(56) References Cited

U.S. PATENT DOCUMENTS

| 5,061,049 A | 10/1991 | Hornbeck | 359/224 |
|---|---|---|---|
| 5,583,688 A | 12/1996 | Hornbeck | 359/291 |
| 6,442,307 B1 * | 8/2002 | Carr et al. | 385/18 |
| 6,466,711 B1 * | 10/2002 | Laor et al. | 385/18 |
| 2002/0057862 A1 * | 5/2002 | Okayama | 385/17 |
| 2002/0122619 A1 * | 9/2002 | Sandler et al. | 385/17 |
| 2002/0136524 A1 * | 9/2002 | Aga Riza | 385/140 |
| 2002/0141689 A1 * | 10/2002 | Qian et al. | 385/18 |
| 2002/0159679 A1 * | 10/2002 | Strasser et al. | 385/16 |
| 2002/0164113 A1 * | 11/2002 | Rensing et al. | 385/18 |
| 2003/0012489 A1 * | 1/2003 | Oikawa | 385/18 |
| 2003/0048980 A1 * | 3/2003 | Hoen | 385/18 |

* cited by examiner

Primary Examiner—Michael C. Zarroli
(74) Attorney, Agent, or Firm—Charles A. Brill; Wade James Brady, III; Frederick J. Telecky, Jr.

(57) ABSTRACT

An optical switch using an array of mirrors (608) to selectively reflect light from an input fiber (610) to either of a first output fiber (612) or a second output fiber (614). Each fiber is held in a ferrule (616) that aligns the fiber with a focusing device (618). The focusing device associated with the input fiber causes the beam of light to either collimate, diverge, or converge. The focusing device associated with each output fiber collects the beam of light for input into the output fibers. Light from the input fiber (610) strikes a first mirror, or group of mirrors, in the array (608) and is selectively deflected to a second mirror, or group of mirrors, associated with an output fiber (612, 614), by reflecting the beam of light from a retro-reflector (602) between the fibers. The second mirror receives the beam from the retro-reflector (602) and reflects it to the output fiber associated with the second mirror.

25 Claims, 5 Drawing Sheets

MICROMIRROR OPTICAL SWITCH

CROSS-REFERENCE TO RELATED APPLICATIONS

This application claims priority under 35 USC §119(e)(1) of provisional application No. 60/164,223 filed Nov. 9, 1999 and provisional application No. 60/236,533 filed Sep. 29, 2000.

| U.S. Pat. No. | Filing Date | Issue Date | Title |
| --- | --- | --- | --- |
| 5,061,049 | Sep. 13, 1990 | Oct. 29, 1991 | Spatial Light Modulator and Method |
| 5,583,688 | Dec. 21, 1993 | Dec. 10, 1996 | Multi-Level Digital Micromirror Device |
| 09/923,911 | Aug. 7, 2001 | | Two Dimensional Blazed MEMS Grating |
| 60/236,677 | Sep. 29, 2000 | | Micromirror Optical Switch |

FIELD OF THE INVENTION

This invention relates to the field of optical communications, more particularly to switches used in fiber-optic networks.

BACKGROUND OF THE INVENTION

Optical networks use modulated light to enable clear, rapid communication between two points. The bandwidth and efficiency provided by optical communication systems is well known. A single fiber is able to carry a great deal of information over a tremendous distance. Practical communication systems utilize large numbers of fibers networked together to form a communication web that provides at least one path between any two points on the network. Configuring the network to connect any two points requires a large number of switches.

One method of coupling optical fibers converts the optical signal carried by the input fiber to electrical signals and uses the electrical signal modulate another light beam that is transmitted along the second fiber. This method is much slower than simply switching the optical beam and may introduce noise into the transmitted optical signal. Purely optical switching, in which the optical beam from a first fiber is coupled directly to a second fiber without significant loss, is much faster and more efficient and is therefore desired.

Several types of optical switches have been developed. Some use mechanical means to physically align the input and output fibers. These mechanical switches typically are slow, large, and very expensive. What is needed is an improved optical switch that is very quick to configure and does not require the light beam to be converted to electricity.

SUMMARY OF THE INVENTION

Objects and advantages will be obvious, and will in part appear hereinafter and will be accomplished by the present invention that provides a method and system for switchably coupling optical fiber communications using a micromirror device. One embodiment of the claimed invention provides an optical switch. The optical switch comprises at least one input fiber, at least one output fiber, a retro-reflective surface, and a mirror array. Each input fiber defining an input optical axis and having an exit end. Each output fiber defining an output optical axis and having an entrance end. The retro-reflective surface interleaved between the exit and entrance ends of the input and output fibers. The mirror array comprised of at least one mirror on each input and output optical axis. The mirrors on the input optical axes operable to deflect light from each input fiber to an intermediate spot on the retro-reflector. The mirrors on the output optical axes operable to reflect light from the intermediate spot of the retro-reflector to an associated output fiber sharing the output axis.

According to a second embodiment of the present invention, a method of forming an optical switch is provided. The method comprises: capturing an end of at least one input fiber in a ferrule; capturing an end of at least one output fiber in a ferrule; capturing the ferrules in a holding block; providing a retro-reflective surface between at least one of the input fibers and at least one of the output fibers; providing an array of mirrors. At least one mirror in the array of mirrors operable to direct light from the input fiber to at least one other mirror associated with an output fiber via the retro-reflecting surface. At least one other mirror associated with the output fiber operable to direct light from the retro-reflecting surface to the associated output fiber.

Yet another embodiment of the present invention provides a 2×2 unblocked optical switch using only single axis rotatable mirrors. The optical switch comprising: a first input fiber; a second input fiber; a first output fiber; a second output fiber; a jumper fiber; and a mirror array. The mirror array is aligned with the input and output fibers to enable the mirror array to selectively deflect light from the first input fiber to either of the first and second output fibers, and from the second input fiber to the first output fiber and the jumper fiber. The jumper fiber positioned to transmit light from a first portion of the mirror array to a second portion of the mirror array. The second portion of said mirror array operable to deflect light from the jumper fiber to said second output fiber.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

A new optical switch has been developed that uses a readily available micromirror device to optically couple two or more optical fibers. The new switch has a fast switching time and provides an efficient and cost-effective way to couple two or more optical fibers.

Figure 1:
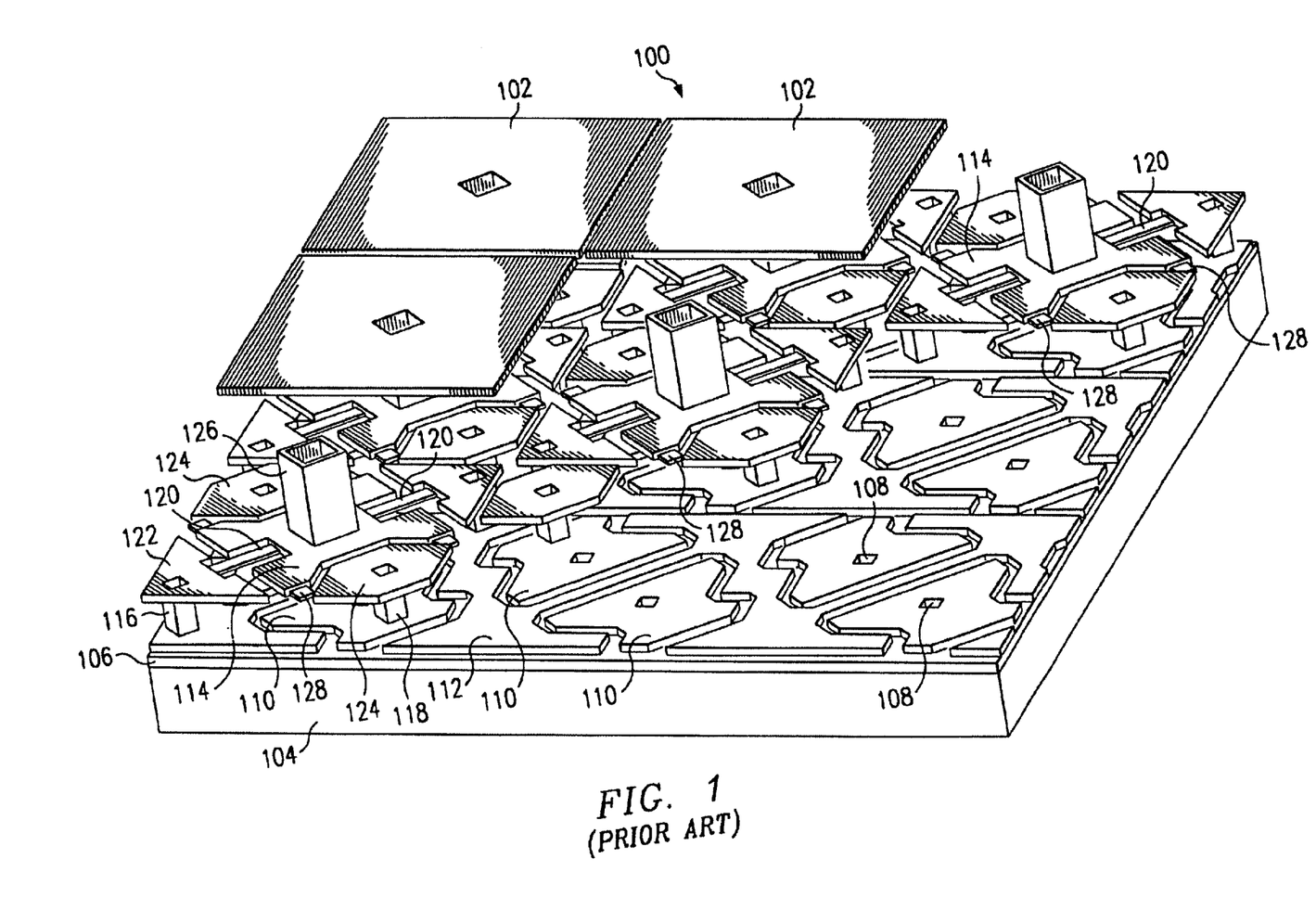
FIG. 1 is a perspective view of a small portion of a micromirror array of the prior art.
Figure 2:
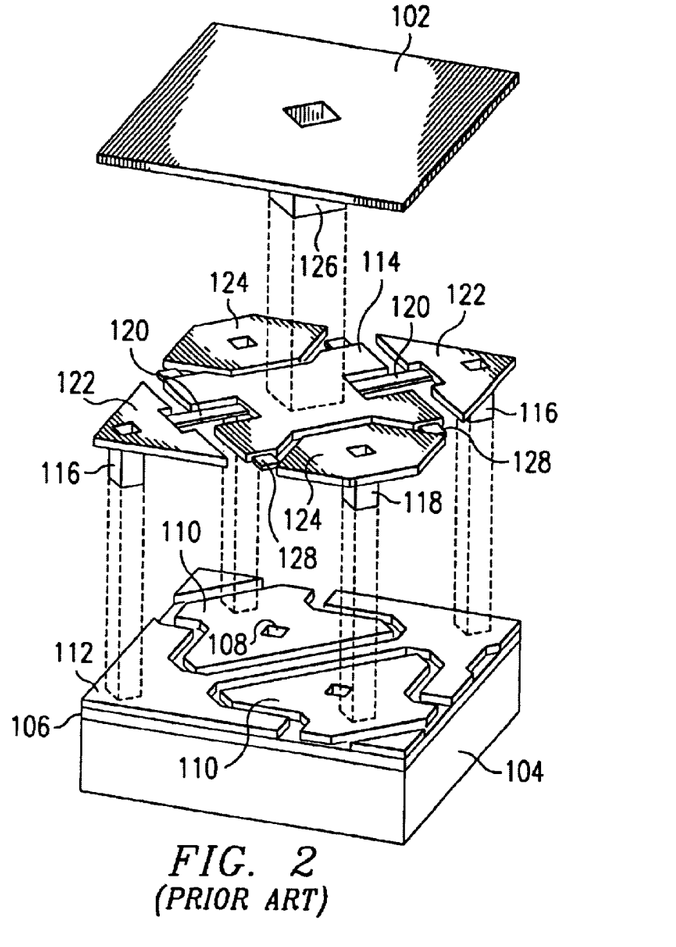
FIG. 2 is an exploded perspective view of a single micromirror element from the micromirror array of FIG. 1.

A typical hidden-hinge DMD 100 is an orthogonal array of DMD cells, or elements. This array often includes more than a thousand DMD rows and columns of DMDs. FIG. 1 shows a small portion of a DMD array of the prior art with several mirrors 102 removed to show the underlying mechanical structure of the DMD array. FIG. 2 is an exploded view of a single DMD element of the prior art further detailing the relationships between the DMD structures.

A DMD is fabricated on a silicon semiconductor substrate 104. Electrical control circuitry typically is fabricated in or on the surface of the semiconductor substrate 104 using standard integrated circuit process flows. This circuitry typically includes, but is not limited to, a memory cell associated with, and typically underlying, each mirror 102 and digital logic circuits to control the transfer of the digital image data to the underlying memory cells. Voltage driver circuits to drive bias and reset signals to the mirror superstructure may also be fabricated on the DMD substrate, or may be external to the DMD. Image processing and formatting logic is also formed in the substrate 104 of some designs. For the purposes of this disclosure, addressing circuitry is considered to include any circuitry, including direct voltage connections and shared memory cells, used to control the direction of rotation of a DMD mirror.

Some DMD configurations use a split reset configuration which allows several DMD elements to share one memory cell—thus reducing the number of memory cells necessary to operate a very large array, and making more room available for voltage driver and image processing circuitry on the DMD integrated circuit. Split reset is enabled by the bistable operation of a DMD, which allows the contents of the underlying memory to change without affecting the position of the mirror 102 when the mirror has a bias voltage applied.

The silicon substrate 104 and any necessary metal interconnection layers are isolated from the DMD superstructure by an insulating layer 106 which is typically a deposited silicon dioxide layer on which the DMD superstructure is formed. Holes, or vias, are opened in the oxide layer to allow electrical connection of the DMD superstructure with the electronic circuitry formed in the substrate 104.

The first layer of the superstructure is a metalization layer, typically the third metalization layer and therefore often called M3. The first two metalization layers are typically required to interconnect the circuitry fabricated on the substrate. The third metalization layer is deposited on the insulating layer and patterned to form address electrodes 110 and a mirror bias connection 112. Some micromirror designs have landing electrodes that are separate and distinct structures but are electrically connected to the mirror bias connection 112. Landing electrodes limit the rotation of the mirror 102 and prevent the rotated mirror 102 or hinge yoke 114 from touching the address electrodes 110, which have a voltage potential relative to the mirror 102. If the mirror 102 contacts the address electrodes 110, the resulting short circuit could fuse the torsion hinges 116 or weld the mirror 102 to the address electrodes 110, in either case ruining the DMD.

Since the same voltage is always applied both to the landing electrodes and the mirrors 102, the mirror bias connection and the landing electrodes are preferably combined in a single structure when possible. The landing electrodes are combined with the mirror bias connection 112 by including regions on the mirror bias/reset connection 112, called landing sites, which mechanically limit the rotation of the mirror 102 by contacting either the mirror 102 or the torsion hinge yoke 114. These landing sites are often coated with a material chosen to reduce the tendency of the mirror 102 and torsion hinge yoke 114 to stick to the landing site.

Mirror bias and reset voltages travel to each mirror 102 through a combination of paths using both the mirror bias/reset metalization 112 and the mirrors and torsion beams of adjacent mirror elements. Split reset designs require the array of mirrors to be subdivided into multiple subarrays each having an independent mirror bias connection. The landing electrode/mirror bias 112 configuration shown in FIG. 1 is ideally suited to split reset applications since the DMD elements are easily segregated into electrically isolated rows or columns simply by isolating the mirror bias/reset layer between the subarrays. The mirror bias/reset layer of FIG. 1 is shown divided into rows of isolated elements.

A first layer of supports, typically called spacervias, is fabricated on the metal layer forming the address electrodes 110 and mirror bias connections 112. These spacervias, which include both hinge support spacervias 116 and upper address electrode spacervias 118, are typically formed by spinning a thin spacer layer over the address electrodes 110 and mirror bias connections 112. This thin spacer layer is typically a 1 µm thick layer of positive photoresist. After the photoresist layer is deposited, it is exposed, patterned, and deep UV hardened to form holes in which the spacervias will be formed. This spacer layer and a thicker spacer layer used later in the fabrication process are often called sacrificial layers since they are used only as forms during the fabrication process and are removed from the device prior to device operation.

A thin layer of metal is sputtered onto the spacer layer and into the holes. An oxide is then deposited over the thin metal layer and patterned to form an etch mask over the regions that later will form hinges 120. A thicker layer of metal, typically an aluminum alloy, is sputtered over the thin layer and oxide etch masks. Another layer of oxide is deposited and patterned to define the hinge yoke 114, hinge cap 122, and the upper address electrodes 124. After this second oxide layer is patterned, the two metals layers are etched simultaneously and the oxide etch stops removed to leave thick rigid hinge yokes 114, hinge caps 122, and upper address electrodes 124, and thin flexible torsion beams 120.

A thick spacer layer is then deposited over the thick metal layer and patterned to define holes in which mirror support spacervias 126 will be formed. The thick spacer layer is typically a 2 µm thick layer of positive photoresist. A layer of mirror metal, typically an aluminum alloy, is sputtered on the surface of the thick spacer layer and into the holes in the thick spacer layer. This metal layer is then patterned to form the mirrors 102 and both spacer layers are removed using a plasma etch.

Once the two spacer layers have been removed, the mirror is free to rotate about the axis formed by the torsion hinge. Electrostatic attraction between an address electrode 110 and a deflectable rigid member, which in effect form the two plates of an air gap capacitor, is used to rotate the mirror structure. Depending on the design of the micromirror device, the deflectable rigid member is the torsion beam yoke 114, the beam or mirror 102, a beam attached directly to the torsion hinges, or a combination thereof. The upper address electrodes 124 also electrostatically attract the deflectable rigid member.

The force created by the voltage potential is a function of the reciprocal of the distance between the two plates. As the rigid member rotates due to the electrostatic torque, the torsion beam hinges resist deformation with a restoring torque that is an approximately linear function of the angular deflection of the torsion beams. The structure rotates until the restoring torsion beam torque equals the electrostatic torque or until the rotation is mechanically blocked by contact between the rotating structure and a fixed component. As discussed below, most micromirror devices are operated in a digital mode wherein sufficiently large bias voltages are used to ensure full deflection of the micromirror superstructure.

Micromirror devices are generally operated in one of two modes of operation. The first mode of operation is an analog mode, sometimes called beam steering, wherein the address electrode is charged to a voltage corresponding to the desired deflection of the mirror. Light striking the micromirror device is reflected by the mirror at an angle determined by the deflection of the mirror.

The second mode of operation is a digital mode. When operated digitally, each micromirror is fully deflected in either of the two directions about the torsion beam axis. Digital operation uses a relatively large voltage to ensure the mirror is fully deflected. Since it is advantageous to drive the address electrode using standard logic voltage levels, a bias voltage, typically a negative voltage, is applied to the mirror metal layer to increase the voltage difference between the address electrodes and the mirrors. Use of a sufficiently large mirror bias voltage —a voltage above what is termed the collapse voltage of the device—ensures the mirror will deflect to the closest landing electrodes even in the absence of an address voltage. Therefore, by using a large mirror bias voltage, the address voltages need only be large enough to deflect the mirror slightly.

Figure 3:
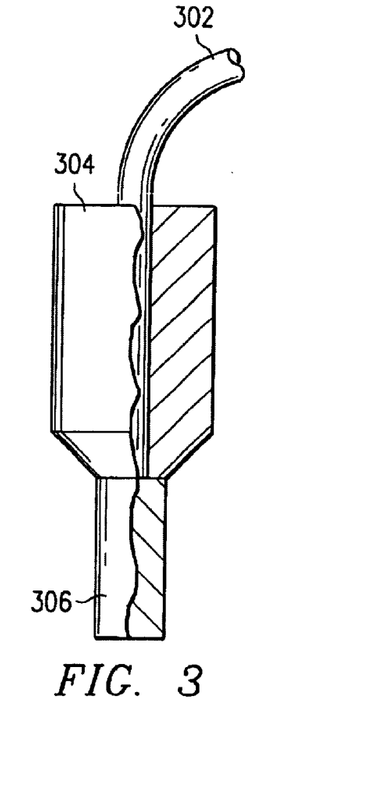
FIG. 3 is a partial cross-section side view of a sheathed optical fiber held in a ferrule with a collimating lens attached.

FIG. 3 is a partial cross-sectional side view of one end of an optical fiber 302 held in a ferrule 304. The ferrule 304 holds a length of the fiber 302 in alignment with a self focusing gradient index (GRIN) lens 306, and simplifies handling of the optical fibers. The GRIN lens collimates the light from the fiber. Collimated light is desired due to the typically small mirror tilt angle provided by common micromirror devices. Depending on the various optical components used to fabricate the switch, converging (focused) or diverging beams are acceptable.

Figure 4:
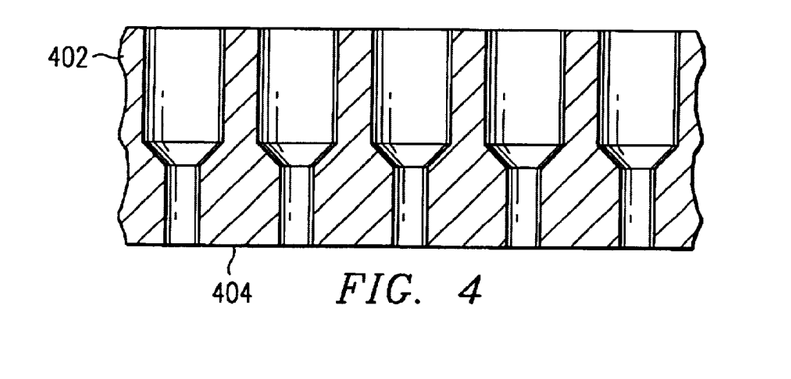
FIG. 4 is a cross-section side view of a holder block designed to hold a number of the ferrules and optical fibers of FIG. 3.

FIG. 4 is a cross-sectional side view of a holder block 402 designed to align a number of the optical fibers and ferrules of FIG. 3. The ferrules are preferably cemented into the holder block, but may be held in the holder block by any of a number of retention mechanisms including clips and molded-in finger that allow insertion of the ferrule into the holder block but prevent removal of the ferrule from the block. A novel feature of the holder block 402 of FIG. 4 is the reflective bottom surface 404. The bottom surface functions as a retro-reflector when the optical switch is assembled.

Figure 5:
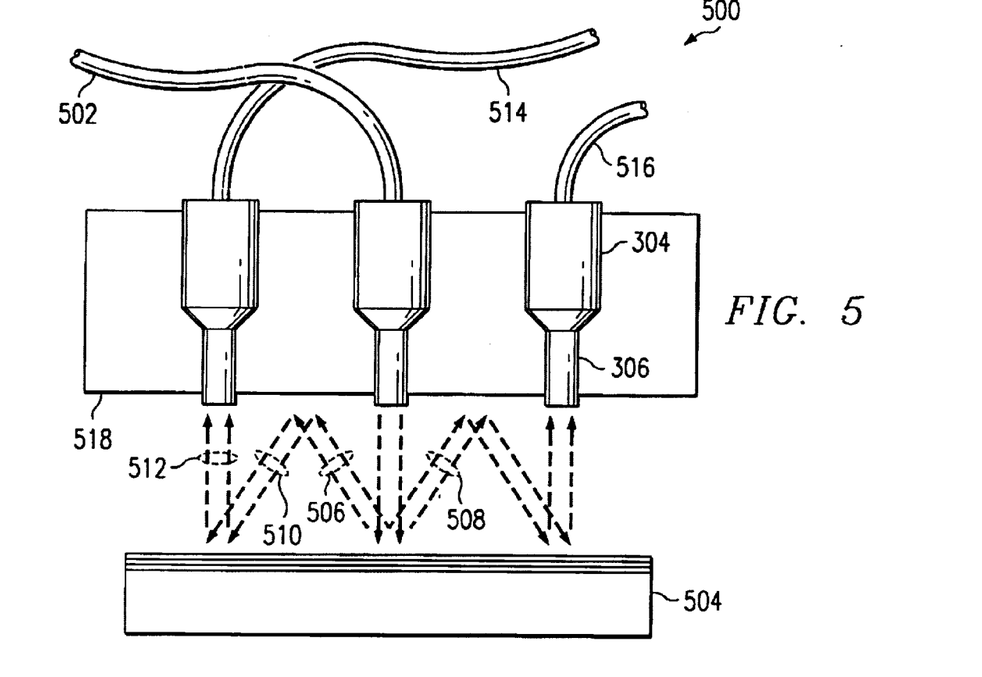
FIG. 5 is a side view of a 1×2 optical switch formed using the holder block of FIG. 4 and a mirror array.

FIG. 5 is a side view of a simple one pole, two throw (1×2) optical switch 500. While the switch is be described in terms of a single input switch having two outputs, it is understood that the switch, like any other switch described herein, can also be used backwards to form a 2×1 switch. In FIG. 5, light from an input fiber 502 passes through the GRIN lens and strikes a micromirror array 504. The micro mirror array 504 in FIG. 5 is comprised of a minimum of three mirrors. The axis of rotation for each of the mirrors in the array 504 is assumed to be perpendicular to the plane of the drawing. Light exiting the input fiber 502 strikes the center of the three mirrors and is either reflected up and to the left along path 506, or up and to the right along path 508, depending on the position of the center mirror. Assuming the center mirror is rotated counterclockwise, the reflected light travels along path 506 and is reflected by the reflective surface 518 of the holder block back toward the mirror array 504 along path 510. When the reflected light reaches the mirror array 504 a second time, the light is reflected along path 512 by a second of the three micromirrors which has been rotated clockwise toward the incoming light beam. After being reflected three times, the light is received by a GRIN lens and enters a first output fiber 514.

Alternatively, light is switched from the input fiber to a second output fiber 516. To switch the light to the second output fiber 516, the first mirror is rotated clockwise to deflect the input light along path 508. In a manner similar to the first switch position, the light traveling along path 508 is reflected by the reflective bottom surface of the holder block 518 to a third mirror in the array. The third mirror is rotated counterclockwise to direct the light toward the GRIN lens.

Although described as an array of three mirrors, the mirror array 504 of FIG. 5 is preferably an array of a very large number of small mirrors. For example, a typical mirror array 504 is an 848×600 array of individually controllable mirrors. Each mirror is a square 16 $\mu$m on each side and spaced 1 $\mu$m from the surrounding mirrors. Each mirror in the array rotates in either direction about an axis parallel to the plane of the array. The axis runs diagonally from one corner to the opposite corner of each mirror. As described in U.S. patent application Ser. No. 09/923,911 entitled Two Dimensional Blazed MEMS Grating, the diffractive effects caused by the mirror array must be taken into account when selecting a rotation or deflection angle. Proper selection of the deflection angle ensures the array operates in an efficient blazed condition. For mirrors on 17 $\mu$m centers, as described above, ideal deflection angles are 7.5° and 11.2°, which blaze the $2^{nd}$ and $3^{rd}$ orders respectively. For mirrors on 13.8 $\mu$m centers, a deflection angle of 9.6° blazes the $2^{nd}$ order.

Because each of the mirrors is so small, the collimated beam of light from each of the input fibers, which is typically 0.80 to 1.2 mm in diameter, falls upon a number of the mirrors. This feature simplifies the alignment between the ferrule holder block 518 and the mirror array 504. Rather than having to align each fiber precisely with a single mirror, the block 518 can be aligned with the entire array of mirrors 504 and the testing process used to determine the relationship between the mirrors and the fibers.

Many device characterization sequences are possible. For example, the mirrors on array 504 initially may all be rotated in a clockwise direction and an input signal provided to input fiber 502. Mirrors in the area associated with output fiber 516 are then rotated counterclockwise, individually or in small groups, while monitoring the output of fiber 516. When one of the mirrors directly beneath the GRIN lens associated with fiber 516 is rotated, the output signal on fiber 516 will increase. The mirrors associated with output fiber 516 are determined either by maximizing the signal on fiber 516 or by picking a point of diminishing returns—where the gain in signal is outweighed by the gain in cross-talk between fibers. A similar process is then used to determine which mirrors are associated with the center fiber 502. If any mirrors are between the regions associated with a fiber they are turned to minimize the interference cross-talk between the fibers.

Figure 6:
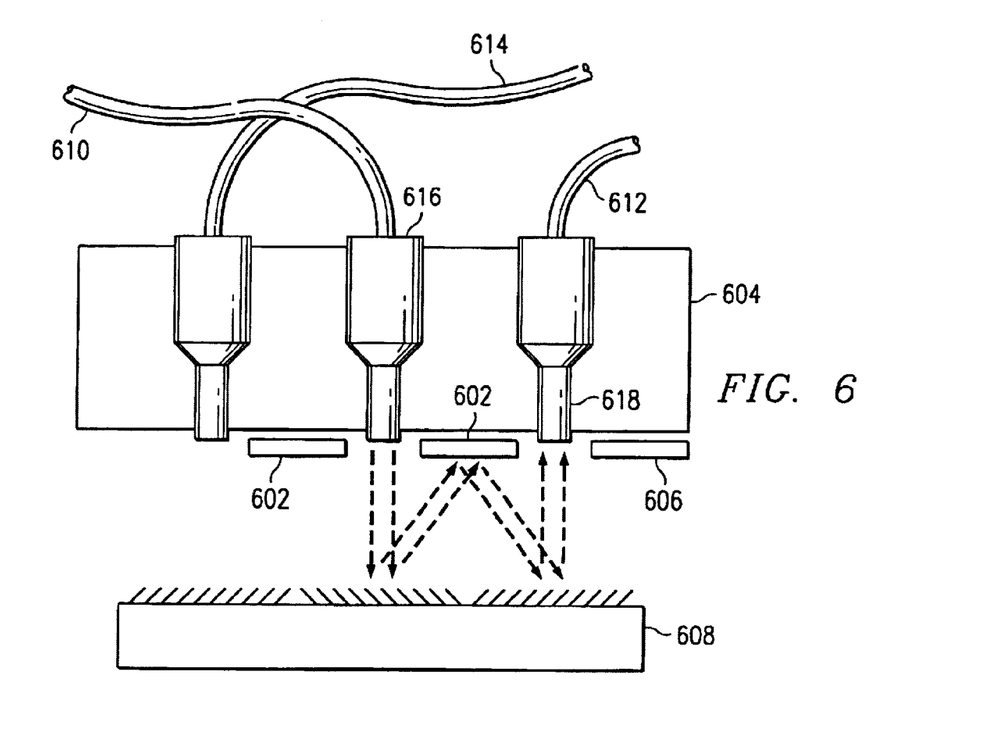
FIG. 6 is a side view of a 1×2 optical switch similar to the switch of FIG. 5, but using separate retro-reflectors instead of the reflective bottom surface of the holder block.

FIG. 6 shows a side view of an alternate embodiment of the optical switch of FIG. 5. In FIG. 6, separate retro-reflectors 602 are used to reflect the light instead of the mirrored bottom surface of the holder block 518. Retro-reflectors 602 simplify the design of the holder block 604, but complicate the assembly and alignment process. The retro-reflector alternatively is one piece, with holes removed for the light to and from each fiber to pass through. To increase the separation between optical switches and to reduce the effect of stray light, some retro-reflectors 606 are designed not to reflect light. The same concept of anti-reflective regions is also applied to the one piece retro-reflector and the bottom mirrored surface of the holding block.

In addition to aligning each fiber with one or more mirrors in the mirror array, the optical switch must also be aligned to enable the light from a first mirror or group of mirrors to bounce off of the retro-reflector and reach the second mirror or group of mirrors. The height of the retro-reflectors, or holding block if a mirrored retro-reflecting holding block is used, is adjusted to maximize the amount of light following the desired path. If the retro-reflector surface is too close to the mirror array, the light reflected by the retro-reflector surface will not reach the next group of mirrors and the two groups of mirrors will not be efficiently coupled. Likewise, if the retro-reflector surface is too far from the mirror array the reflected light will overshoot the desired group of mirrors.

Although not shown, alternate embodiments of the disclosed optical switch are designed to require additional reflections before reaching the targeted group of mirrors. For example, if the distance between the input and output fibers is large, or if the mirror tilt angle is very low, an additional reflection from the retro-reflector and mirror array is required to displace the beam of light to the output fiber. Because each reflection increases the diffraction and loss, however, the number of reflections is typically held to a minimum.

The optical switch of FIGS. 5 and 6 enables the use of a digital micromirror—that is, a micromirror that has two stable operating states. In the case of FIGS. 5 and 6, each mirror is assumed to rotate fully in either the clockwise or counterclockwise direction. The positions in which the mirror is stable are determined by the physical features of the mirror including the size and shape of the mirror and the height of the mirror above the substrate. Compared to analog mirror control schemes, digital operation provides the advantage of reducing the susceptibility of the mirror array to drift over time and temperature. Nevertheless, analog mirrors, or analog mirror arrays, alternatively are used to form the optical switch.

Figure 7:
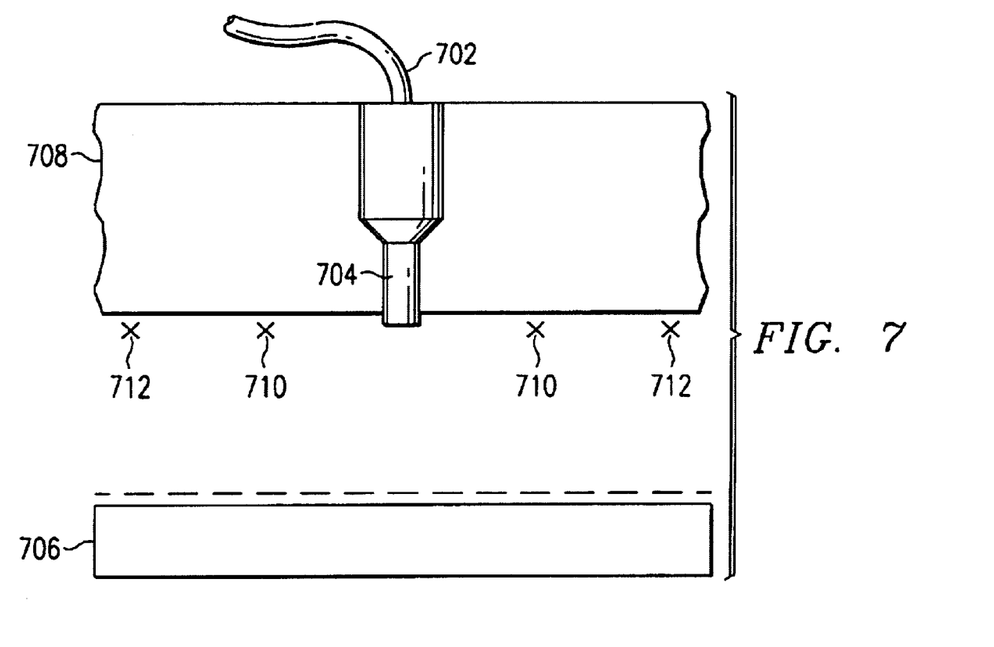
FIG. 7 is a side view of a single optical fiber held in a holder block showing the diffraction effects that occur when using an array of small mirrors to switch the optical signal from the fiber.

If an array of mirrors is used to deflect each beam, as opposed to a single mirror, the diffraction of the beam by the array of mirrors affects the operation of the switch. The diffraction effect is controlled by the feature size of the array—that is, but the size of the mirrors and the pitch between the mirrors. FIG. 7 illustrates the effects of diffraction on the optical switch of FIGS. 5 and 6. In FIG. 7, a light beam exiting fiber 702 through a collimating lens 704 strikes the mirror array 706 and is diffracted. The light diffracted by the array will reinforce itself as it reflects back to the holder block 708, forming a series of points of light at locations representing the diffraction orders 710, 712. Likewise, the returning light will cancel itself out between these diffraction orders resulting in dark regions between the orders.

These diffraction orders represent the locations at which the light efficiently can be directed by the mirror array. The pitch between the orders is a function of the wavelength of the light and the pitch of the mirror array as well as the height of the holder block or image plane above the mirror array. Selecting the tilt angle of the mirror allows the mirror array to become a blazed grating for a given wavelength, maximizing the coupling of the input light into a given diffraction order. Therefore, the pitch of the array and the tilt angle of the mirrors should be selected to create a blazed diffraction grating for the wavelength of light being switched. Additionally, the f-number of the collecting lens for the two output fibers is selected to allow capture of as much energy from the input beam as practical. Depending on the distances involved, the collecting lens may capture multiple diffraction orders, allowing the diffraction concerns described above to be ignored.

Figure 8:
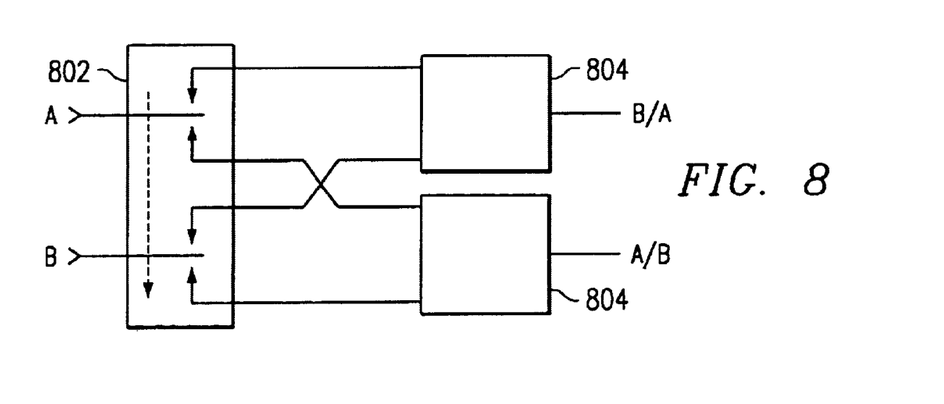
FIG. 8 is a schematic view of a 2×2 array comprised of two 1×2 switches and two optical couplers.

In addition to the 1×2 switch described above, several other switch configurations are possible using the 1×2 switch as a fundamental building block. FIG. 8 is a schematic drawing of a simple 2×2 switch using the structure and methods of the above 1×2 switch. In FIG. 8, two 1×2 switches are controlled in concert to form a 2T2P switch 802. When the switch is in the position shown by the arrow, any signal on input A is passed to the bottom output, while signals on the B input are passed to the top output. In the other position A is passed to the top output and B is passed to the bottom output. Couplers 804 combine the four outputs from the two individual switches to produce two outputs from the switch.

The 2×2 switch shown in FIG. 8 is symmetric—that is, the signal path through any combination on inputs and outputs is the same. This feature results in the same insertion loss for all signals passing through the switch regardless of the position of the switch.

Figure 9:
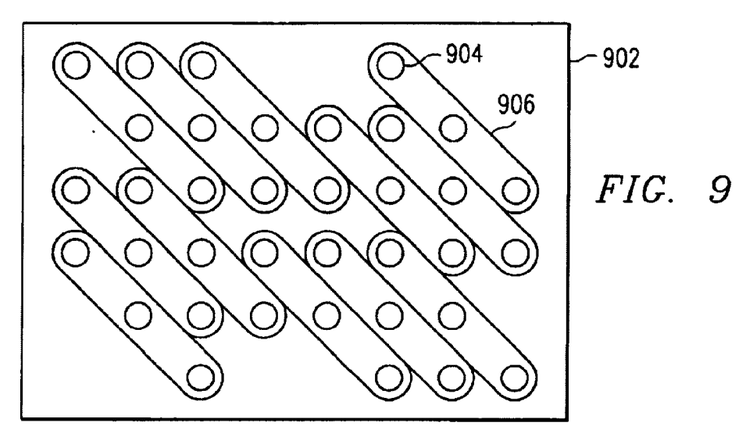
FIG. 9 is a plan view of a holder block showing the arrangement of twelve 1×2 switches on a single mirror array.

Additional 1×2 switches can be added to create larger unblocked crossbar switches. For example, a typical micro-mirror device having an array of 848 columns and 600 rows can be used to form twelve of the 1×2 switches. FIG. 9 shows one arrangement of the ferrules in a holding block 902 over a mirror array to obtain the twelve 1×2 switches. In FIG. 9, the round circles 904 indicate holes for the ferrules and the ovals 906 indicate the grouping of the fibers to achieve the 1×2 switches.

Two of these twelve switches are combined to make a 2×2 switch. Three of the 2×2 switches form a 3×3 switch. Six of the 2×2 switches form a 4×4 switch. Larger numbers of array or 1×2 switches are needed to form larger crossbar switches. Customized ferrules, focusing means, and holder blocks enable larger switches, such as an unblocked 8×8 switch, to be formed from a single array.

Figure 10:
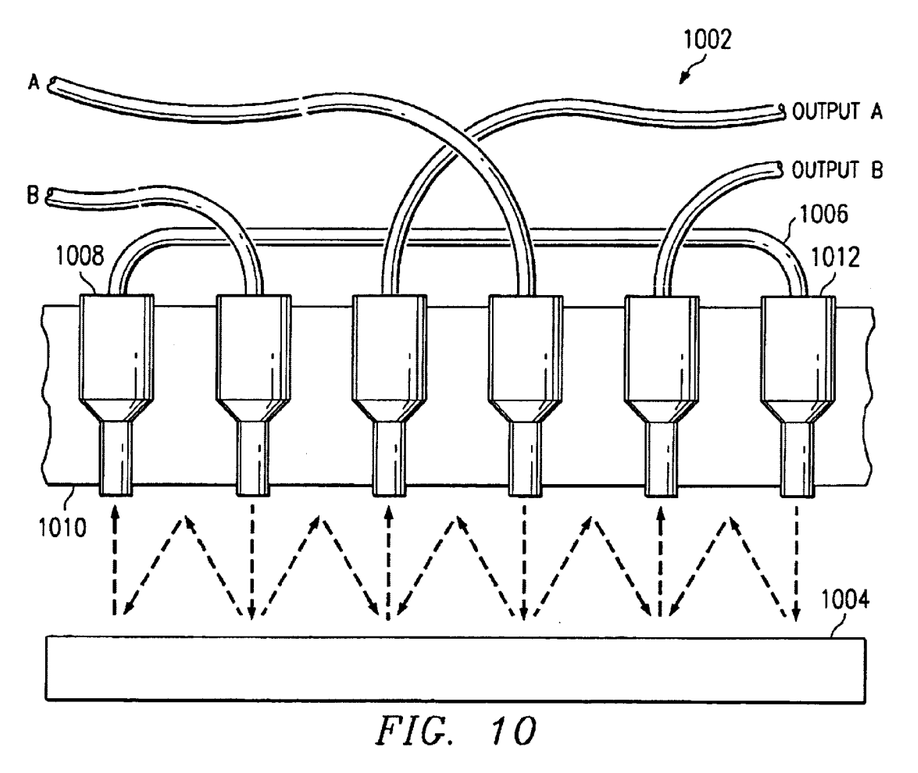
FIG. 10 is a side view of a 2×2 optical switch using a jumper fiber and not requiring the use of optical couplers.

There are many other grouping of fibers and mirrors that create additional switches. FIG. 10 shows one arrangement of six mirrors, or groups of mirrors, to obtain an unblocked 2×2 switch 1002. The switch of FIG. 10 does not require the use of optical couplers. In FIG. 9) 10, light from input A is deflected by the mirror array 1004 either left to output A, or right to output B. Light from input B is deflected right to output A, or left to a jumper connection. In FIG. 10, an additional fiber, jumper fiber 1006, is connected between a ferrule 1008 on the left end of the holder block 1010 to a ferrule 1012 on the right end of the holder block. This additional jumper fiber forms a connection between the left and rights ends of the array, providing a path for light from input B to reach output B.

Thus, although there has been disclosed to this point a particular embodiment for a micromirror optical switch and method therefore, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. An optical switch comprising:
   at least one input fiber, each said input fiber defining an input optical axis and having an exit end;
   at least one output fiber, each said output fiber defining an output optical axis and having an entrance end;
   a retro-reflective surface between said exit and entrance ends; and
   a mirror array, said mirror array comprised of at least one mirror on each said input optical axis and said output optical axis, said mirrors on said input optical axes operable to deflect light from each input fiber to an intermediate spot on said retro-reflector, said mirrors on said output optical axes operable to reflect light from said intermediate spot of said retro-reflector to an associated output fiber sharing said output axis.

2. The optical switch of claim 1, further comprising a holding block holding said at least one input fiber.

3. The optical switch of claim 1, further comprising a holding block holding said at least one output fiber.

4. The optical switch of claim 1, further comprising a focusing element between said input fiber and said mirror array.

5. The optical switch of claim 4, said focusing element further comprising a collimating lens.

6. The optical switch of claim 4, said focusing element further comprising a converging lens.

7. The optical switch of claim 4, said focusing element further comprising a diverging lens.

8. The optical switch of claim 4, said focusing element further comprising a diffractive focusing means.

9. The optical switch of claim 4, said focusing element further comprising a refractive focusing means.

10. The optical switch of claim 4, said focusing element further comprising a gradient index self focusing lens.

11. The optical switch of claim 1, said at least one input fiber comprising one input fiber and said at least one output fiber comprising two output fibers.

12. The optical switch of claim 1, said mirror array comprised of an array of mirrors, each of said at least one mirror comprising a group of mirrors operating in concert to direct said light from said input fibers to said output fibers.

13. The optical switch of claim 1, further comprising a holding block to align said at least one output fiber.

14. The optical switch of claim 13, said retro-reflective surface comprised of the bottom surface of said holding block.

15. A method of forming an optical switch, said method comprising:
    capturing an end of at least one input fiber in a ferrule;
    capturing an end of at least one output fiber in a ferrule;
    capturing said ferrules in a holding block;
    providing a retro-reflective surface between at least one of said input fibers and at least one of said output fibers;
    providing an array of mirrors, at least one mirror in said array of mirrors operable to direct light from said input fiber to at least one other mirror associated with an output fiber via said retro-reflecting surface, said at least one other mirror associated with said output fiber operable to direct light from said retro-reflecting surface to said associated output fiber.

16. The method of claim 15, further comprising the step of holding said at least one input fiber, said at least one output fiber, said retro-reflective surface, and said array of mirrors in alignment such that reflection from said array of mirrors is blazed.

17. The method of claim 15, further comprising the step of providing a focusing means associated with said at least one input fiber.

18. The method of claim 15, further comprising the step of providing a focusing means associated with said at least one output fiber.

19. The method of claim 15, further comprising the step of providing a refractive lens associated with said at least one output fiber.

20. The method of claim 15, further comprising the step of providing a refractive lens associated with said at least one output fiber.

21. The method of claim 15, further comprising the step of providing a diffractive lens associated with said at least one output fiber.

22. The method of claim 15, further comprising the step of providing a diffractive lens associated with said at least one output fiber.

23. The method of claim 15, further comprising the step of providing a gradient index lens associated with said at least one output fiber.

24. The method of claim 15, further comprising the step of providing a gradient index lens associated with said at least one output fiber.

25. An optical switch comprising:
    a first input fiber;
    a second input fiber;
    a first output fiber;
    a second output fiber;
    a jumper fiber; and
    a mirror array, said mirror array aligned with said input and output fibers to enable said mirror array to selectively deflect light from said first input fiber to either of said first and second output fibers, and from said second input fiber to said first output fiber and said jumper fiber, said jumper fiber positioned to transmit light from a first portion of said mirror array to a second portion of said mirror array, said second portion of said mirror array operable to deflect light from said jumper fiber to said second output fiber.

* * * * *